United States Patent
Cismas et al.

(10) Patent No.: US 9,414,062 B2
(45) Date of Patent: Aug. 9, 2016

(54) ADAPTIVE MOTION ESTIMATION CACHE ORGANIZATION

(71) Applicant: GEO SEMICONDUCTOR INC., San Jose, CA (US)

(72) Inventors: Sorin C. Cismas, Saratoga, CA (US); Simon Butler, San Rafael, CA (US)

(73) Assignee: GEO SEMICONDUCTOR INC., San Clara, CA (US)

( * ) Notice: Subject to any disclaimer, the term of this patent is extended or adjusted under 35 U.S.C. 154(b) by 820 days.

(21) Appl. No.: 13/692,063

(22) Filed: Dec. 3, 2012

(65) Prior Publication Data

US 2013/0094570 A1 Apr. 18, 2013

Related U.S. Application Data

(62) Division of application No. 11/305,457, filed on Dec. 15, 2005, now Pat. No. 8,325,798.

(51) Int. Cl.

| H03C 1/52 | (2006.01) |
|---|---|
| H04L 27/04 | (2006.01) |
| H03K 7/06 | (2006.01) |
| H03D 1/24 | (2006.01) |
| H04N 19/51 | (2014.01) |
| H04N 19/433 | (2014.01) |
| H04N 19/573 | (2014.01) |

(52) U.S. Cl.
CPC ....... *H04N 19/00715* (2013.01); *H04N 19/433* (2014.11); *H04N 19/573* (2014.11)

(58) Field of Classification Search
CPC .... G06F 17/147; H04N 19/523; H04N 5/145; H04N 7/0112; H04N 19/51

USPC ......... 345/418, 474, 501, 557, 647, 600, 629; 382/243, 232

See application file for complete search history.

(56) References Cited

U.S. PATENT DOCUMENTS

| 5,412,401 | A | * | 5/1995 | Wolf | ........................ | H04N 9/74 |
|---|---|---|---|---|---|---|
| | | | | | | 345/600 |
| 5,598,514 | A | * | 1/1997 | Purcell | .................. | G06F 17/147 |
| | | | | | | 345/418 |
| 5,828,725 | A | | 10/1998 | Levinson | | |
| 5,828,785 | A | * | 10/1998 | Kitsuki | ................. | G06T 7/2013 |
| | | | | | | 348/E5.066 |
| 6,163,576 | A | | 12/2000 | Lempel | | |
| 6,279,076 | B1 | | 8/2001 | Shishido et al. | | |
| 6,289,050 | B1 | * | 9/2001 | Ohtani | .................. | G06T 7/2026 |
| | | | | | | 348/E5.066 |

(Continued)

OTHER PUBLICATIONS

Non-Final Rejection for U.S. Appl. No. 11/305,457; mailed on Mar. 16, 2012.

(Continued)

*Primary Examiner* — Akwasi M Sarpong
(74) *Attorney, Agent, or Firm* — Sughrue Mion, PLLC

(57) ABSTRACT

In some embodiments, a motion estimation search window cache is adaptively re-organized according to frame properties including a frame width and a number of reference frames corresponding to the current frame to be encoded/decoded. The cache reorganization may include an adaptive mapping of reference frame locations to search window cache allocation units (addresses). In some embodiments, a search window is shaped as a quasi-rectangle with truncated upper left and lower right corners, having a full-frame horizontal extent. A search range is defined in a central region of the search window, and is laterally bounded by the truncated corners.

19 Claims, 14 Drawing Sheets

```
int SWSize;     // Search Window size in allocation units
int PicStr;     // Picture Structure
int FrameMBsOnly; // Frame Macroblocks only are present in frame
int FrmSizeX;   // Frame width in macroblocks - 1
int MBX     // Frame width in macroblocks
int VAU;    // Virtual allocation unit number
int AU;     // Allocation unit number within search window
int Offset;     // Start of the search window within SW RAM in
                // allocation units.
int AAU;        // Absolute allocation in SW SRAM
int RefX;   // X address of the 16x8 block within the reference frame
int RefY;   // Y address of the 16x8 block within the reference frame
int MBAFF;      // The SWRAM is in field mode MBAFF = (PicStr == 0) & !FrameMBsOnly;
MBX = FrmSizeX + 1;
if(!MBAFF)
    {
    RefY = ((VAU/(2*MBX)) * 16) + ((VAU & 0x1) * 8)
         - ((Vunits[0]) * 8);
    RefX = ((VAU%(2*MBX))/2) * 16;
    }
else
    {
    RefY = ((VAU/(4*MBX)) * 32) + ((VAU & 0x3) * 8)
         - ((Vunits[1]) * 16);
    RefX = ((VAU%(4*MBX))/4) * 16;
    }

AU  = VAU%(SWSize << 3);
AAU = AU + Offset;
```

| 0 | 2 | 4 | 6 | 8 | 10 |
|---|---|---|---|---|---|
| 1 | 3 | 5 | 7 | 9 | 11 |
| 12 | 14 | 16 | 18 | 20 | 22 |
| 13 | 15 | 17 | 19 | 21 | 23 |
| 24 | ... | | | | |
| 25 | | | | | |
| | | | | 0 | 2 |
| | | | | 1 | 3 |

(56) References Cited

U.S. PATENT DOCUMENTS

| | | | |
|---|---|---|---|
| 6,681,297 B2 | 1/2004 | Chauvel et al. | |
| 6,690,727 B1 | 2/2004 | Mehta | |
| 6,697,076 B1 * | 2/2004 | Trivedi | G06F 12/0815 345/531 |
| 6,772,299 B2 | 8/2004 | McWilliams et al. | |
| 6,829,391 B2 * | 12/2004 | Comaniciu | G06T 9/001 382/232 |
| 7,006,100 B2 * | 2/2006 | Phong | H04N 19/433 345/536 |
| 2004/0141554 A1 * | 7/2004 | Phong | H04N 19/433 375/240.12 |
| 2006/0239345 A1 * | 10/2006 | Taubman | H04N 19/52 375/240.03 |

OTHER PUBLICATIONS

Non-Final Rejection for U.S. Appl. No. 11/305,457; mailed on Oct. 7, 2011.

Final Rejection for U.S. Appl. No. 11/305,457; mailed on May 12, 2011.

Non-Final Rejection for U.S. Appl. No. 11/305,457; mailed on Dec. 23, 2010.

* cited by examiner

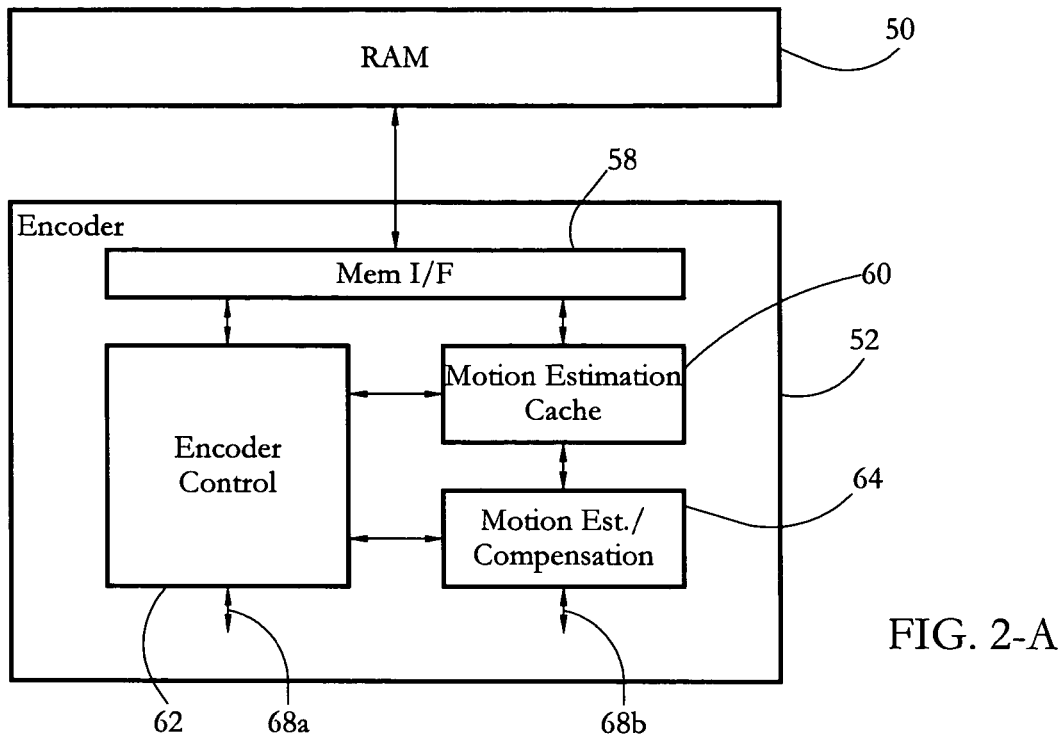
FIG. 2-A
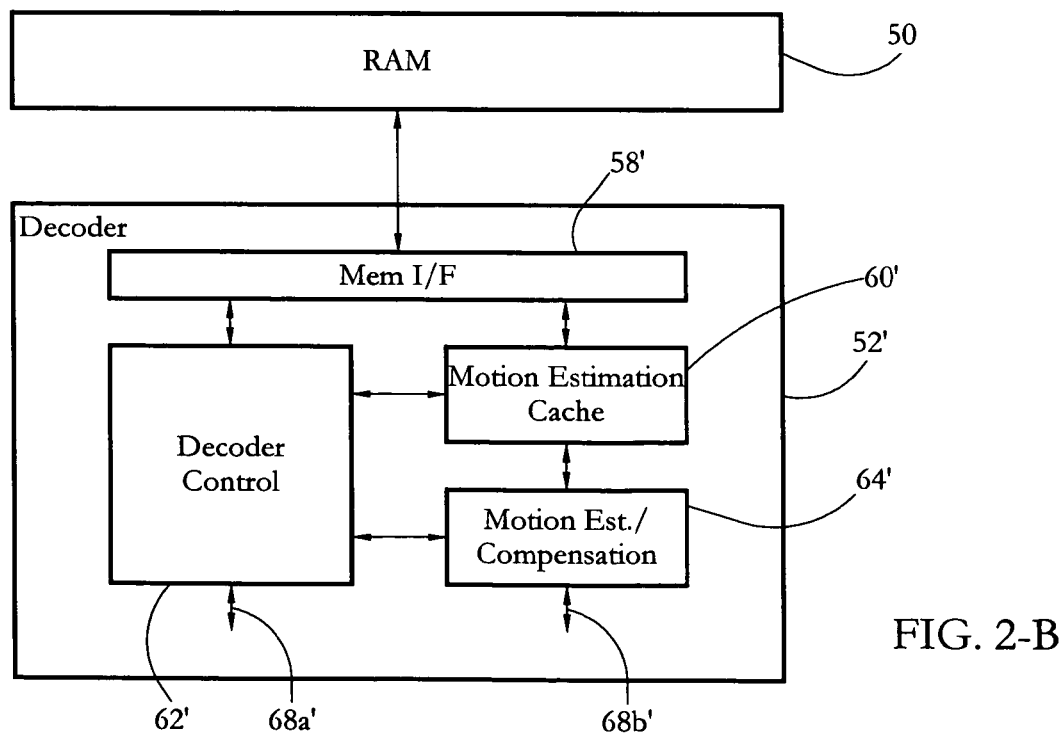
FIG. 2-B

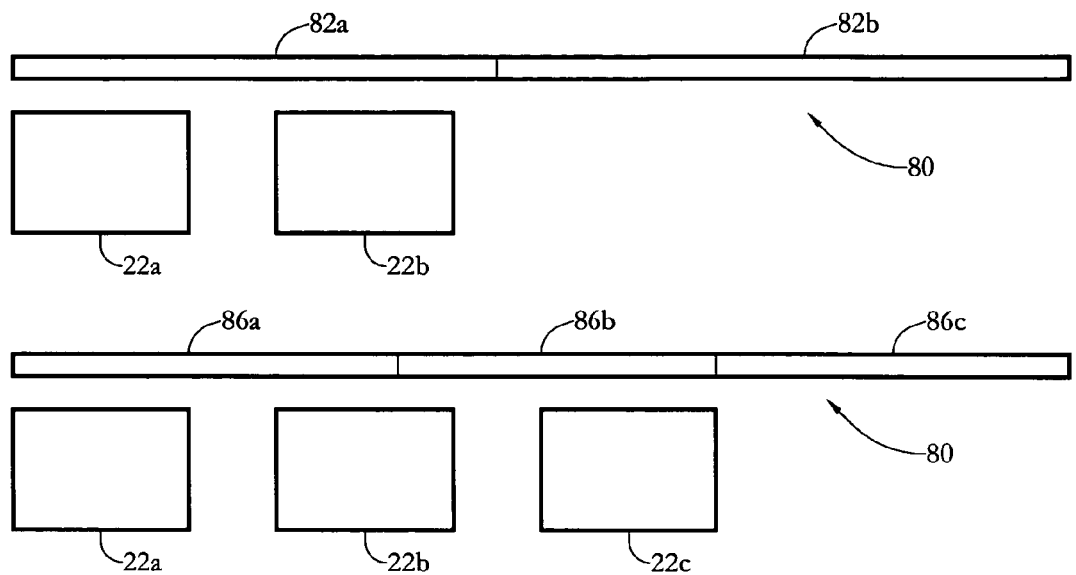
FIG. 3-A
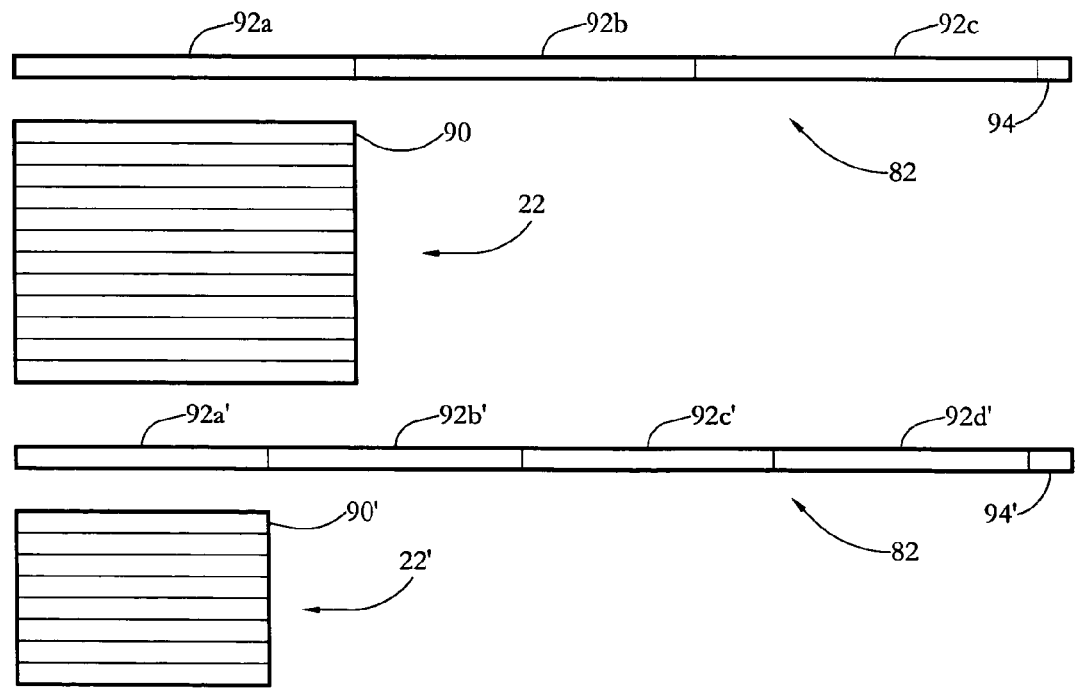
FIG. 3-B

```
int SWSize;      // Search Window size in allocation units
int PicStr;      // Picture Structure
int FrameMBsOnly;  // Frame Macroblocks only are present in frame
int FrmSizeX;    // Frame width in macroblocks - 1
int MBX          // Frame width in macroblocks
int VAU;         // Virtual allocation unit number
int AU;          // Allocation unit number within search window
int Offset;      // Start of the search window within SW RAM in
                 // allocation units.
int AAU;         // Absolute allocation in SW SRAM
int RefX;        // X address of the 16x8 block within the reference frame
int RefY;        // Y address of the 16x8 block within the reference frame
int MBAFF;       // The SWRAM is in field mode MBAFF = (PicStr == 0) & !FrameMBsOnly;
MBX = FrmSizeX + 1;
if(!MBAFF)
    {
    RefY = ((VAU/(2*MBX)) * 16) + ((VAU & 0x1) * 8)
         - ((Vunits[0]) * 8);
    RefX = ((VAU%(2*MBX))/2) * 16;
    }
else
    {
    RefY = ((VAU/(4*MBX)) * 32) + ((VAU & 0x3) * 8)
         - ((Vunits[1]) * 16);
    RefX = ((VAU%(4*MBX))/4) * 16;
    }

AU  = VAU%(SWSize << 3);
AAU = AU + Offset;
```

FIG. 5-A

| 0  | 2  | 4  | 6  | 8  | 10 |
|----|----|----|----|----|----|
| 1  | 3  | 5  | 7  | 9  | 11 |
| 12 | 14 | 16 | 18 | 20 | 22 |
| 13 | 15 | 17 | 19 | 21 | 23 |
| 24 | ... |   |   |   |   |
| 25 |    |   |   |   |   |
|    |    |   |   | 0 | 2 |
|    |    |   |   | 1 | 3 |

FIG. 5-B

| 0  | 4  | 8  | 12 | 16 | 20 |
|----|----|----|----|----|----|
| 1  | 5  | 9  | 13 | 17 | 21 |
| 2  | 6  | 10 | 14 | 18 | 22 |
| 3  | 7  | 11 | 15 | 19 | 23 |
| 24 | ... |   |   |   | 0 |
| 25 |    |   |   |   | 1 |
| 26 |    |   |   |   | 2 |
| 27 |    |   |   |   | 3 |

FIG. 5-C

```
int SWSize;    // Search Window size inallocation units
int FrmSizeX;  // Frame width in macroblocks - 1
int PicStr;    // Picture Structure 00 - Frame, 01 - reserved
               // 10 - Top Field, 11 - Bottom Field
int FrameMBsOnly;  // frame macroblocks only
int spare;

if(PicStr[1] || FrameMBsOnly)
    {   // Not MBAFF
    VUnit = SWSize/(2*(FrmSizeX+1));
    do {
        spare = SWSize%(2*(FrmSizeX+1));
        HUnit = ((spare/2)-1)/2;
        if(HUnit > (FrmSizeX+1)
            HUnit = FrmSizeX+1;
        spare = SWSize - (Vunit * 2 * (FrmSizeX+1)) - 2((HUnit * 2)+1);
        if(spare < 2)
            {
            HUnit -= 1:
            spare += 4;
            }
        vrange = (8*VUnit)-2;
        hrange = (16*HUnit)-2;
        VUnit -= 1;
        }while(vrange > hrange)
    }
else
    {   // MBAFF
    VUnit = (SWSize/(2*(FrmSizeX+1))) & ~0x1; // must be even
    do {
        spare = SWSize - (VUnit * 2 * (FrmSizeX+1));
        HUnit = ((spare/4) - 1)/2;
        if(HUnit > (FrmSizeX+1)
            HUnit = FrmSizeX+1;
        spare = SWSize - (VUnit * 2 * (FrmSizeX+1)) - 4((HUnit*2)+1);
        if(spare < 4)
            {
            HUnit -= 1;
            spare += 8;
            }
        vrange = (8*VUnit)-2;
        hrange = (16*HUnit)-2;
        VUnit -= 1;
        }while(vrange > hrange)
    }
VUnit += 1;
```

FIG. 6

```
int mvx, mvy;   // motion vector, determined externally
int FrmSizeX;   // Frame width in macroblocks - 1
int MBX;    // Width of frame in macroblock units
int PicStr;     // Picture Structure
int FrameMBsOnly; // Frame macroblocks only
int MBAFF;      // Macroblock adaptive field/frame
int field;      // MBAFF decision is field mode
int currmbx, currmby; // x-y coordinates of current macroblock
int xoff, yoff; // x/y offsets in allocation units
int auoffset;   // offset in allocation units
int refx, refy;         // x-y coordinates of reference block
int auline;    // Line number within Allocation unit
int auxoff;    // x offset along allocation unit line
int VAU;    // virtual allocation unit number
int AU;     // allocation unit number
int AAU;    // absolute allocation unit
int offset;    // Start of search window in allocation units
int VUnit;    // Vertical search range in allocation units
MBX = FrmSizeX + 1;
MBAFF = (PicStr == 0) & !FrameMBsOnly;
// Map refx and refy to an allocation unit.
// First determine the allocation unit containing the first line of the
// macroblock (for MBAFF the allocation unit containing the first line
// of the macroblock pair). In practice this may be computed
// incrementally in order to perform the modulus operation in a
// single cycle
if(!MBAFF)
    {
    AU = (2 * currmby * MBX) + (2 * currmbx) + (VUnit & 0x1);
    AU %= SWSize;
    }
else
    {
    AU = (2 * (currmby & ~0x2) * MBX) + (4 * currmbx) + (VUnit & 0x2);
    AU %= SWSize;
```

FIG.11-A

```
// next compute the horizontal and vertical offsets in allocation units
xoff = mvx >> 4;
auxoff = mvx & 0xf;
if(!MBAFF)
    {
    yoff = mvy >> 3;
    auline = mvy & 0x7;
    }
else
    {
    if(!field)
        {
        yoff = ((currmby << 1) & 0x2) + (mvy >> 3);
        auline = mvy & 0x7;
        }
    else
        {
        yoff = mvy >> 2;
        auline = (mvy << 2) | (currmby & 0x1);
        }
    }
// Convert horizontal and vertical offsets to an absolute offset
if(!MBAFF)
    {
    if(!(VUnit & 0x1))
        auoffset = (( yoff    & ~0x1) * MBX) + (yoff & 0x1)
                 + (2 * xoff);
    else
        auoffset = (((yoff+1) & ~0x1) * MBX) - (yoff & 0x1)
                 + (2 * xoff);
    }
else
    {
    if(!(VUnit & 0x2))
        auoffset = (( yoff    & ~0x3) * MBX) + (yoff & 0x2)
                 + (yoff & 0x1) + (4 * xoff);
    else
        auoffset = (((yoff+2) & ~0x3) * MBX) - (yoff & 0x2)
                 + (yoff & 0x1) + (4 * xoff);
    }
AU = (AU + auoffset)%SWSize;
```

FIG.11-B

ADAPTIVE MOTION ESTIMATION CACHE ORGANIZATION

CROSS REFERENCE TO RELATED PATENT APPLICATIONS

This application is a divisional of and claims priority to U.S. patent application Ser. No. 11/305,457, filed Dec. 15, 2005, entitled "Adaptive Motion estimation Cache Organization," which is herein incorporated by reference in its entirety.

COPYRIGHT NOTICE

This disclosure contains material, including exemplary source code, which is subject to copyright protection. The copyright owner has no objection to the facsimile reproduction by anyone of the patent disclosure as it appears in the Patent and Trademark Office patent file or records, but otherwise reserves all copyright rights whatsoever.

BACKGROUND

The invention relates to video data processing systems and methods, and in particular to video coding (encoding/decoding) systems and methods.

Commonly-used video coding methods are based on MPEG (Moving Pictures Experts Group) standards such as MPEG-2, MPEG-4 (MPEG 4 Part 2) or H.264 (MPEG 4 Part 10). Such coding methods typically employ three types of frames: I—(intra), P—(predicted), and B—(bidirectional) frames. An I-frame is encoded spatially using data only from that frame (intra-coded). P- and B-frames are encoded using data from the current frame and/or other frames (inter-coded). Inter-encoding involves encoding differences between frames, rather than the full data of each frame, in order to take advantage of the similarity of spatially and/or temporally proximal areas in typical video sequences. Some encoding methods also use intra-frame predictions to encode data differentially with respect to prediction data from the same frame.

Each frame is typically divided into multiple non-overlapping rectangular blocks. Blocks of 16×16 pixels are commonly termed macroblocks. Other block sizes used in encoders using the H.264 standard include 16×8, 8×16, 8'8, 8×4, 4×8, and 4×4 pixels. To encode a block predictively, a typical MPEG encoder searches for a corresponding similar block (prediction) in one or more reference frames. If a similar block is found, the MPEG encoder stores residual data representing differences between the current block and the similar block, as well as motion vectors identifying the difference in position between the blocks. The residual data is converted to the frequency domain using a transform such as a discrete cosine transform (DCT). The resulting frequency-domain data is quantized and variable-length (entropy) coded before storage/transmission. During decoding, the data of a block of interest is generated by summing decoded residual and prediction data.

Some video sequences may be encoded as a series of complete frames (progressive sampling), or as a sequence of interlaced fields (interlaced sampling). An interlaced field includes either the odd-numbered or the even-numbered lines in a frame. A video encoder may encode macroblocks in a frame DCT mode, in which each block is frequency-transformed as a whole, or in a field DCT mode, in which the luminance samples from field 1 are placed in the top half of the macroblock and the samples from field 2 are placed in the bottom half of the macroblock before frequency-domain transfer. In a field motion compensation mode, the data of the two fields in a macroblock may be motion-compensated separately; in such a mode, each macroblock has two associated motion compensation vectors—one for each field. The type of encoding (field or frame) may be specified for each frame or slice. In a macroblock-adaptive frame/field (MBAFF) encoding mode, the type of encoding (field or frame) is specified at the macroblock level. In MBAFF encoding, data may be encoded using vertically-stacked macroblock pairs, 16×32 pixels each. Each macroblock pair may be encoded in a frame mode, with the two macroblocks in the pair encoded separately, or in a field mode, with the 16×16 field 1 of the macroblock pair and the 16×16 field 2 of the macroblock pair encoded separately.

Searching for a prediction for a current macroblock is commonly performed in a search window, which is a sub-area of a reference frame. A search window may be a horizontal stripe or band vertically centered about the current macroblock position, and may include tens or hundreds of macroblocks. Accessing (reading/writing) prediction data to and from memory may require relatively high memory bandwidths.

SUMMARY

According to one aspect, a video data processing method comprises performing an adaptive mapping of a set of prediction data of a reference video frame to a motion estimation cache according to a width of the reference video frame, and accessing the prediction data in the motion estimation cache according to the adaptive mapping.

According to another aspect, a video data processing method comprises performing an adaptive partitioning of a motion estimation cache in a number of partitions determined by a number of reference frames corresponding to a current frame; and accessing prediction data in the motion estimation cache according to the adaptive partitioning.

According to another aspect, a video data processing method comprises adaptively configuring an organization of a motion estimation cache according to a set of properties of a set of reference frames corresponding to a current frame to be coded; and accessing reference frame prediction data in the motion estimation cache according to the organization of the motion estimation cache.

According to another aspect, a video coding apparatus comprises a motion estimation cache; and a motion estimation cache manager connected to the motion estimation cache. The motion estimation cache manager is configured to adaptively configure an organization of the motion estimation cache according to a set of properties of a set of reference frames corresponding to a current frame to be coded; and access prediction data in the motion estimation cache according to the organization of the motion estimation cache.

BRIEF DESCRIPTION OF THE DRAWINGS

The foregoing aspects and advantages of the present invention will become better understood upon reading the following detailed description and upon reference to the drawings where:

FIG. 2-A shows a video encoder including a motion estimation cache and cache manager according to some embodiments of the present invention.

FIG. 2-B shows a video decoder including a motion estimation cache and cache manager according to some embodiments of the present invention.

FIG. 3-A shows an exemplary partitioning of a motion estimation cache into two or three partitions each corresponding to a reference frame, according to some embodiments of the present invention.

FIG. 3-B illustrates a relationship between cache locations and frame widths, according to some embodiments of the present invention.

FIG. 5-A shows exemplary code mapping an address of a cache allocation unit to the top left corner of a 16×8 rectangle in a reference frame, according to some embodiments of the present invention.

FIGS. 5-B-C illustrate a mapping of cache allocation units to reference frame locations performed according to the code of FIG. 5-A for non-MBAFF and MBAFF pictures, respectively, according to some embodiments of the present invention.

FIG. 6 shows exemplary code illustrating an adaptive computation of a motion estimation search range as a function of cache partition size and frame width, according to some embodiments of the present invention.

FIGS. 11-A-B show exemplary code illustrating a mapping of a motion vector to a motion estimation cache allocation unit, according to some embodiments of the present invention.

DETAILED DESCRIPTION OF PREFERRED EMBODIMENTS

Figure 1:
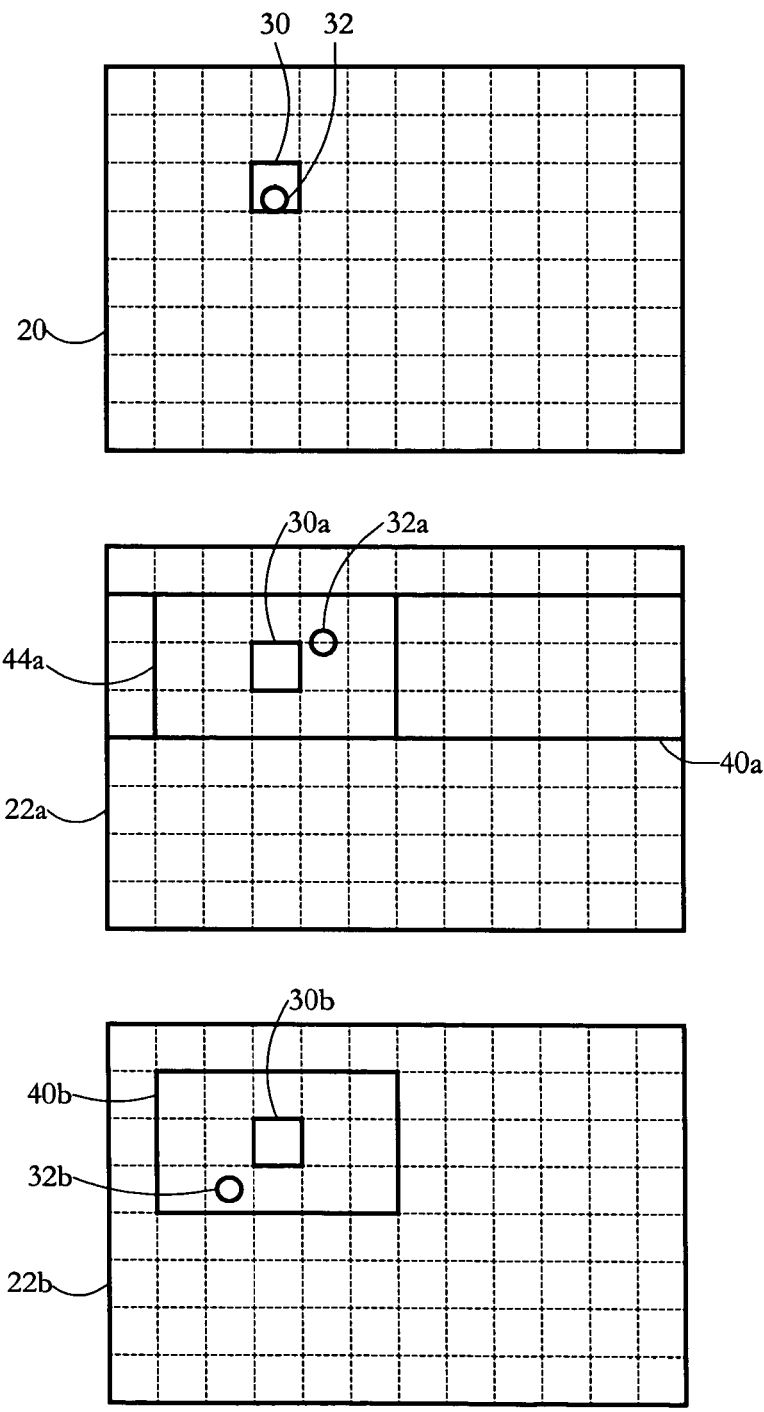
FIG. 1 illustrates an exemplary current frame and two exemplary corresponding reference frames according to some embodiments of the present invention.

In the following description, it is understood that all recited connections between structures can be direct operative connections or indirect operative connections through intermediary structures. A set of elements includes one or more elements. Any recitation of an element is understood to refer to at least one element. Unless otherwise required, any described method steps need not be necessarily performed in a particular illustrated order. Unless otherwise specified, the term coding encompasses encoding and/or decoding. Accessing data in a cache encompasses reading and/or writing the data. The statement that a cache configuration is performed adaptively means that the configuration is performed in response to potentially-varying characteristics of received video data, and not merely during a design of the cache. A first element (e.g. data) derived from a second element encompasses a first element equal to the second element, as well as a first element generated by processing the second element and optionally other data. The term block encompasses macroblocks (16×16 blocks), are well as blocks of other sizes, such as conventional macroblock partitions. Unless otherwise specified, block dimensions (e.g. 16×8) are listed in a (horizontal, vertical) order. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Unless otherwise specified, any recited encoder or decoder may be implemented using any combination of special-purpose encoding/decoding logic and/or software code running on a programmable processor (e.g. a microcontroller or general-purpose processor). Unless otherwise specified, the term "cache" encompasses both an overall cache and individual cache partitions of a larger cache. Unless otherwise specified, a recited motion estimation cache may be a motion estimation cache in an encoder and/or decoder; in an encoder, such a cache may store a motion estimation search window for performing a motion estimation search, while in a decoder such a cache may store prediction data to be used in reconstructing video data. Computer readable media encompass storage media such as magnetic, optic, and semiconductor media (e.g. hard drives, optical disks, flash memory, DRAM), as well as communications links such as conductive cables and fiber optic links.

The following description illustrates embodiments of the invention by way of example and not necessarily by way of limitation.

In some embodiments, the present invention provides systems and methods for adaptively configuring a motion estimation cache organization according to properties of a current frame to be encoded/decoded. In particular, the motion estimation cache organization is configured according to a number of reference frames used to encode/decode the current frame, and/or according to the width (horizontal extent) of the current frame. Configuring the cache organization includes altering a mapping between reference frame locations and cache memory addresses. Adaptively configuring the cache organization according to frame properties as described below allows optimizing the cache utilization and minimizing the external memory bandwidth used for motion estimation data, particularly for encoders/decoders processing frames having different widths and different numbers of associated reference frames. Different widths may correspond to different display formats, such as standard definition (720 horizontal pixels), VGA (640 horizontal pixels), QVGA (320 pixels), XGA (1024 horizontal pixels), and HDTV (1280 or 1920 horizontal pixels).

FIG. 1 shows an exemplary frame 20 to be encoded by a video encoder, as well as two exemplary reference frames 22a-b, according to some embodiments of the present invention. In some embodiments, a reference frame may coincide with the current frame to be encoded. Frame 20 includes plurality of macroblocks, including a current macroblock 30.

Macroblock 30 includes an exemplary visual feature 32, which may be part of an object in the image to be encoded. If reference frames 22*a*-*b* are temporally close to frame 20, corresponding similar visual features 32*a*-*b* are likely to be found at locations within frames 22*a*-*b* that are not too distant from the original position of video feature 32 within macroblock 30. The reference frame macroblocks located in the frame position of macroblock 30 are shown at 30*a*-*b*. A search for macroblocks in reference frames 22*a*-*b* that are similar in content to macroblock 30 may be centered about macroblocks 30*a*-*b*. An exemplary band-shaped search window 40*a* is shown for reference frame 22*a*, while an exemplary laterally-bounded search window 40*b* is shown for reference 22*b*. To reduce the memory bandwidth used by the motion estimation process, the data of a search window such as search windows 40*a*-*b* is pre-fetched into a cache/buffer, and subsequent search operations are performed on the cached data. A search may be performed within a search range (sub-area) within a search window, as illustrated by an exemplary search range 44*a* defined within search window 40*a*. A search range may also coincide with a full extent of a search window.

FIG. 2-A shows a schematic diagram of a video encoder 52 and an associated off-chip random access memory (RAM) 50, according to some embodiments of the present invention. Encoder 52 includes a memory interface 58 connected to RAM 50, an encoder controller 62 connected to memory interface 58, a motion estimation cache unit 60 connected to memory interface 58 and encoder controller 62, and a motion estimation/compensation unit 64 connected to encoder controller 62 and motion estimation cache unit 60. Encoder 52 may include other units performing operations such as quantization, frequency-domain transform, and variable length encoding. Such units may be connected to the encoder units shown in FIG. 2-A, as illustrated schematically by the connections 68*a*-*b*.

In some embodiments, encoder controller 62 comprises a programmable microcontroller running software that controls a number of configurable motion estimation cache organization parameters described below. In some embodiments, one or more blocks of encoder 52 may be data-driven hardware cores interconnected as described in U.S. Pat. No. 6,145,073. Motion estimation cache unit 60 includes a motion estimation cache and associated cache control logic. The cache control logic controls an adaptive mapping of reference frame data to cache locations, described in detail below. Motion estimation/compensation unit 64 receives reference frame data from motion estimation cache unit 60, and performs a motion estimation search using the received reference frame data.

FIG. 2-B shows a schematic diagram of a video decoder 52' and an associated RAM 50, according to some embodiments of the present invention. Decoder 52' includes a memory interface 58' connected to RAM 50, a decoder controller 62' connected to memory interface 58', a motion estimation cache unit 60' connected to memory interface 58' and decoder controller 62', and a motion estimation/compensation unit 64' connected to decoder controller 62' and motion estimation cache unit 60'. Decoder 52' may include other units performing operations such as inverse quantization, inverse frequency-domain transform, and variable length decoding. Such units may be connected to the decoder units shown in FIG. 2-B, as illustrated schematically by the connections 68*a*-*b'*.

In some embodiments, decoder controller 62' comprises a programmable microcontroller running software that controls a number of configurable motion estimation cache organization parameters described below. In some embodiments, one or more blocks of encoder 52 may be data-driven hardware cores interconnected as described in U.S. Pat. No. 6,145,073. Motion estimation cache unit 60' includes a motion estimation cache and associated cache control logic. The cache control logic controls an adaptive mapping of reference frame data to cache locations, described in detail below. Motion estimation/compensation unit 64' receives reference frame data from motion estimation cache unit 60', and uses the retrieved data to reconstruct video data to be displayed.

In some embodiments, the same motion estimation cache and cache manager may be used for both encoding and decoding operations, for example in a coding apparatus capable of both encoding and decoding video data.

In some embodiments, the motion estimation cache is partitioned in a number of cache partitions according to a number of reference frames associated with the current frame to be encoded/decoded. FIG. 3-A illustrates an exemplary partitioning of a motion estimation cache 80 into two partitions 82*a*-*b* when a current frame is being encoded/decoded with reference to two reference frames 22*a*-*b*, and into three cache partitions 82*a*-*c'* when a current frame is being encoded/decoded with reference to three reference frames 86*a*-*c*.

In some embodiments, the size of each cache partition may be chosen to be 1/N of the motion estimation cache, wherein N is the number of reference frames associated with the current frame. In some embodiments, different cache partitions may have unequal sizes. For example, a cache partition size for a given reference frame may be chosen according to a temporal distance between the current frame and the reference frame. In some instances, a number of reference frames may exceed a maximum available number of partitions; in such instances, the cache partitions may accommodate only some of the reference frames.

In some embodiments, each cache partition is organized according to a reference frame width. In particular, a mapping of reference frame locations to cache memory addresses is configured according to a reference frame width as described below. FIG. 3-B illustrates an exemplary mapping of lines 90 of a reference frame 22 to corresponding cache address ranges 92*a*-*c* of a cache partition 82, and an exemplary mapping of lines 90' of a reference frame 22' to corresponding cache address ranges 92*a*-*d'*. Lines 90 have larger widths (larger horizontal pixel numbers) than lines 90'. As a result, a particular location (for example, the first pixel of the second line) in each reference frame will get mapped to different cache memory addresses within cache 82. Remainder regions 94, 94' may be used to store additional data as described below.

In some embodiments, the addresses of a motion estimation cache are grouped in multi-pixel allocation units. A search window and a search range within the search window may be defined in allocation units. An exemplary allocation unit size is 16×8 (horizontal×vertical) pixels, i.e. half a macroblock, described in detail below. In some embodiments, an allocation unit may be defined as a macroblock, a macroblock partition, or multiple macroblocks.

Figure 4:
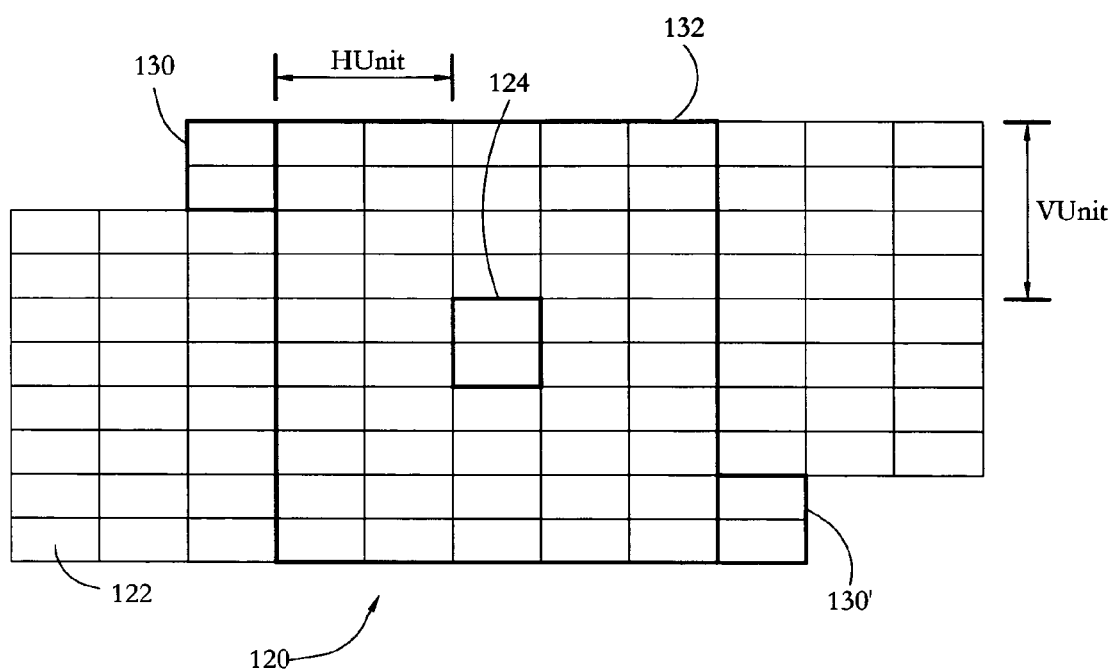
FIG. 4 shows a motion estimation search window organization including allocation units arranged generally as a rectangle with two truncated corners, according to some embodiments of the present invention.

In some embodiments, a search window may correspond to a non-rectangular reference frame area. In particular, a search window reference frame area may be shaped as a quasi-rectangle with truncated upper-left and lower-right corner areas. FIG. 4 shows an exemplary truncated-corner quasi-rectangle search window 120 centered about a current macroblock position 124. Search window 120 extends horizontally across an entire reference frame width, and vertically across a part of the reference frame height. The reference frame data within search window 120 is grouped in 16×8 allocation units 122 defined in a motion estimation cache.

Search window 120 includes a rectangular search range 132. Search range 132 defines a subset of search window allocation units within which a motion estimation search is performed for the current macroblock. Search range 132 is characterized by a horizontal search range HUnit and a vertical search range VUnit, which may be expressed as numbers of allocation units. The horizontal and vertical sizes of search range 132 are 2×HUnit+1 and 2×VUnit+1, respectively.

To advance the search range 132 to a new position centered one macroblock to the right of the current macroblock position 124, an allocation unit pair storing the data of an upper-left reference frame location 130 is overwritten with the data of a lower-right reference frame location 130'. Locations 130, 130' can be thought of as search window advancement regions.

The following discussion provides a better understanding of an exemplary approach to adaptively configuring a motion estimation cache organization, including adaptively mapping cache allocation units to a reference frame, mapping motion vectors to allocation units, allocating and de-allocating cache units as coding progresses, and computing a search window search range, according to some embodiments of the present invention. The exemplary adaptive configuration approach described below allows a full and efficient use of the motion estimation cache for accessing reference frames having different widths and other characteristics. Frames having different widths are stored in the cache at different times. A given video frame sequence typically includes frames having the same width.

The discussion below will focus on an exemplary cache including 160 K of SRAM partitioned in 1280 allocation units (AU), each of 128 bytes (half a macroblock luma). The SRAM may be provided as eight 2560×64 single-port SRAM units. Each AU is used as a 16×18 array storing luminance (luma) data. The 1280 allocation units are adaptively divided among up to four reference frames. As a skilled artisan will appreciate, other memory size and memory organization parameters may be used in some embodiments of the present invention.

The size of a cache partition n (corresponding to a reference frame n) may be determined by a SWSize[n] register, which may define the cache partition (search window) size in multiples of eight allocation units. If the motion estimation cache is divided into four search windows, a start address for each search window may be computed as Offset[0]=0, Offset[1]=SWSize[0]<<3 (i.e. the contents of SWSize[0] multiplied by eight), Offset[2]=(SWSize[0]+SWSize[1])<<3, Offset[3]=(SWSize[0]+SWSize[1]+SWSize[2])<<3.

Cache allocation units are mapped to external RAM addresses and reference frame locations. In some embodiments, a cache address within a given search window is formed by concatenating an absolute allocation unit number (0-1279) with a line number within the allocation unit to form a 12-bit address, SWAddr[11:0]. The absolute allocation unit number is equal to the sum of the allocation unit number within a search window and the start offset of the search window.

FIG. 5-A shows exemplary C-like code suitable for determining a location of the top left corner of a 16×8 block of the reference frame corresponding to an allocation unit of the search window. The exemplary code of FIG. 5-A generates horizontal and vertical locations of a given allocation unit within a reference frame for a given absolute allocation unit number (termed VAU in FIG. 5-A), a search window size, and search window offset. FIGS. 5-B and 5-C illustrate corresponding allocation unit number relationships to reference frame positions for a 44-AU search window and 8×6 (48 AU) non-MBAFF and MBAFF pictures, respectively. As illustrated by FIGS. 5-B-C, the mapping of allocation unit numbers to reference frame locations depends on the frame width and search window size.

In some embodiments, a motion estimation search range also depends on the frame width and/or cache partition size. Consider an exemplary adaptive configuration of a motion estimation search range as a function of search window size (cache partition size) and frame width. FIG. 6 shows C-like code illustrating an exemplary adaptive computation of a motion estimation search range as a function of cache partition size (SWSize), frame width (FrmSizeX+1), and picture coding type according to some embodiments of the present invention. The code of FIG. 6 uses a variable FrameMBSOnly to indicate that a reference frame includes only frame macroblocks, and a variable PicStr to denote a macroblock structure or, for field macroblocks, a macroblock field (frame, top field, or bottom field). The code of FIG. 6 generates search range size parameters HUnit and VUnit (shown in FIG. 4), a parameter Ready indicating when sufficient allocation units have been written, and a parameter Deallocate indicating when an allocation unit written to the cache may be overwritten. One HUnit corresponds to 16 pixels, and one VUnit corresponds to 8 pixels.

The code of FIG. 6 can be better understood with reference to the exemplary search window shape shown in FIG. 4. The code of FIG. 6 assigns a tentative value of a vertical search range (VUnit, expressed in number of allocation units) equal to half a search window (cache partition) size divided by a frame width. The code then determines a number of original spare allocation units, which is set to a remainder of the division performed to generate the tentative vertical search range. A tentative horizontal search range is assigned according to the number of original spare allocation units. The code checks whether at least two spare allocation units remain for the search window advancement regions 130, 130' (FIG. 4); if not, the horizontal search range is decreased by one. If the horizontal search range measured in pixels (hrange) is less than a vertical search range measured in pixels (vrange), the code incrementally decreases the vertical search range and extends the horizontal search range until the horizontal search range is at least equal to the vertical search range. A separate corresponding calculation is performed for MBAFF frames, for which data is processed in stacked macroblock pairs.

FIGS. 7, 8, 9 and 10 show exemplary mappings of reference frame locations to motion estimation cache allocation units, and vertical and horizontal search ranges computed according to the code of FIG. 6, for several frames parameters according to some embodiments of the present invention. The block positions in each figure denote positions within the reference frame, while each number within a block denotes the allocation unit number used to store the data of that block in the motion estimation cache.

Figure 7:
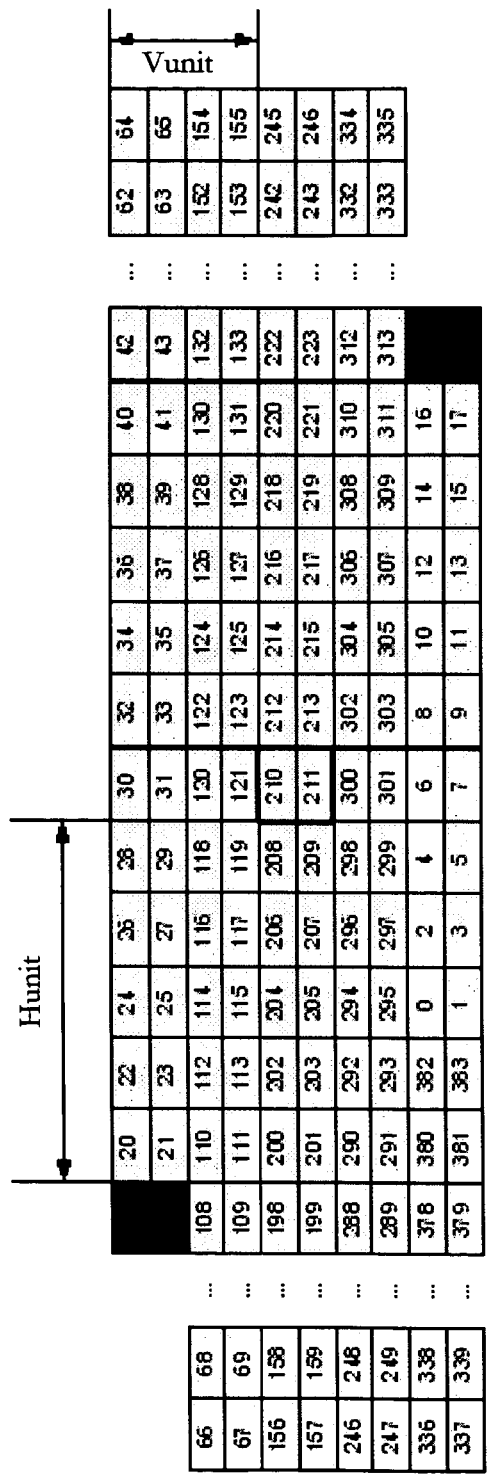
FIG. 7 shows an exemplary mapping of reference frame locations to motion estimation cache allocation units for a non-MBAFF frame and a vertical search range spanning an even number of allocation units, according to some embodiments of the present invention.

FIG. 7 illustrates a non-MBAFF picture having an even-numbered vertical search range, for a frame width of 720 pixels (FrmSizX=44), and a search window size of 384 allocation units (SWSize=384). The computed vertical and horizontal search ranges are VUnit=4 and HUnit=5.

Figure 8:
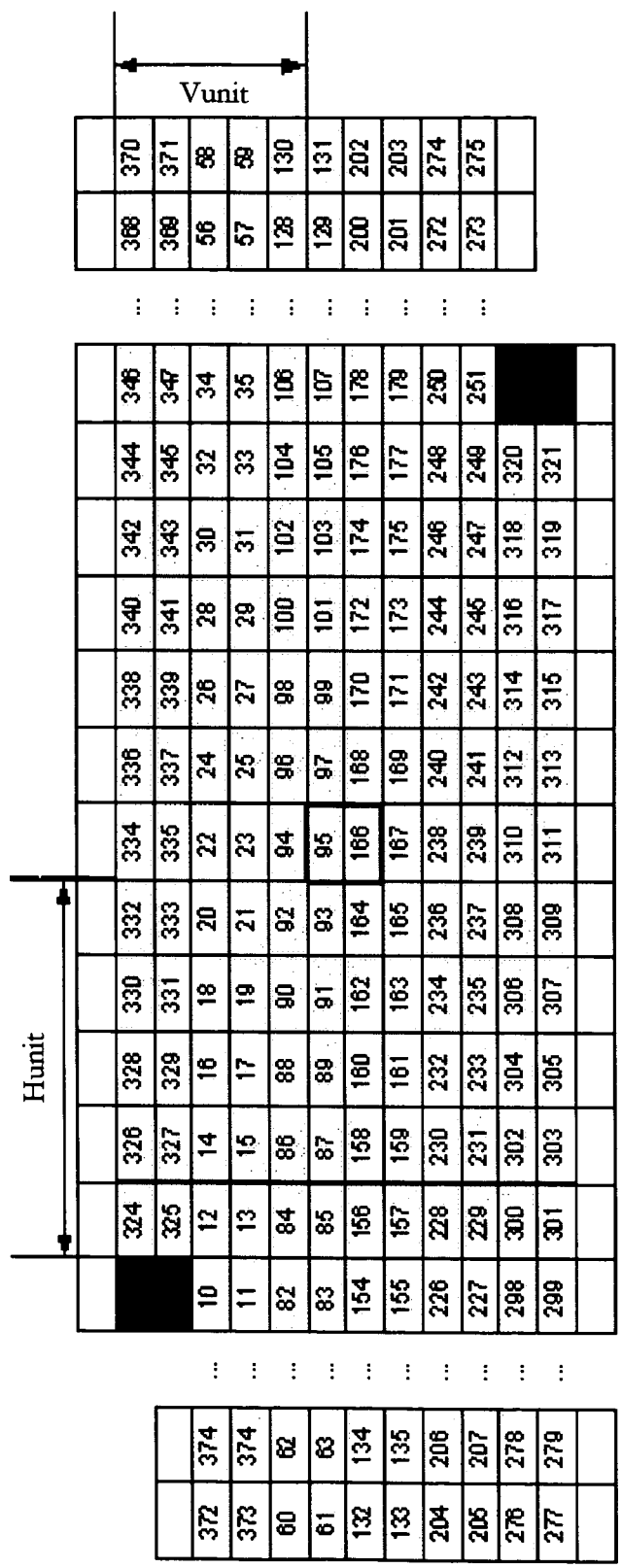
FIG. 8 shows an exemplary mapping of reference frame locations to motion estimation cache allocation units for a non-MBAFF frame and a vertical search range spanning an odd number of allocation units, according to some embodiments of the present invention.

FIG. 8 illustrates a non-MBAFF picture having an odd-numbered vertical search range, for a frame width of 576 pixels (FrmSizeX=35) and a search window of 384 allocation units (SWSize=384). The computed vertical and horizontal search ranges are VUnit=5 and HUnit=5.

Figure 9:
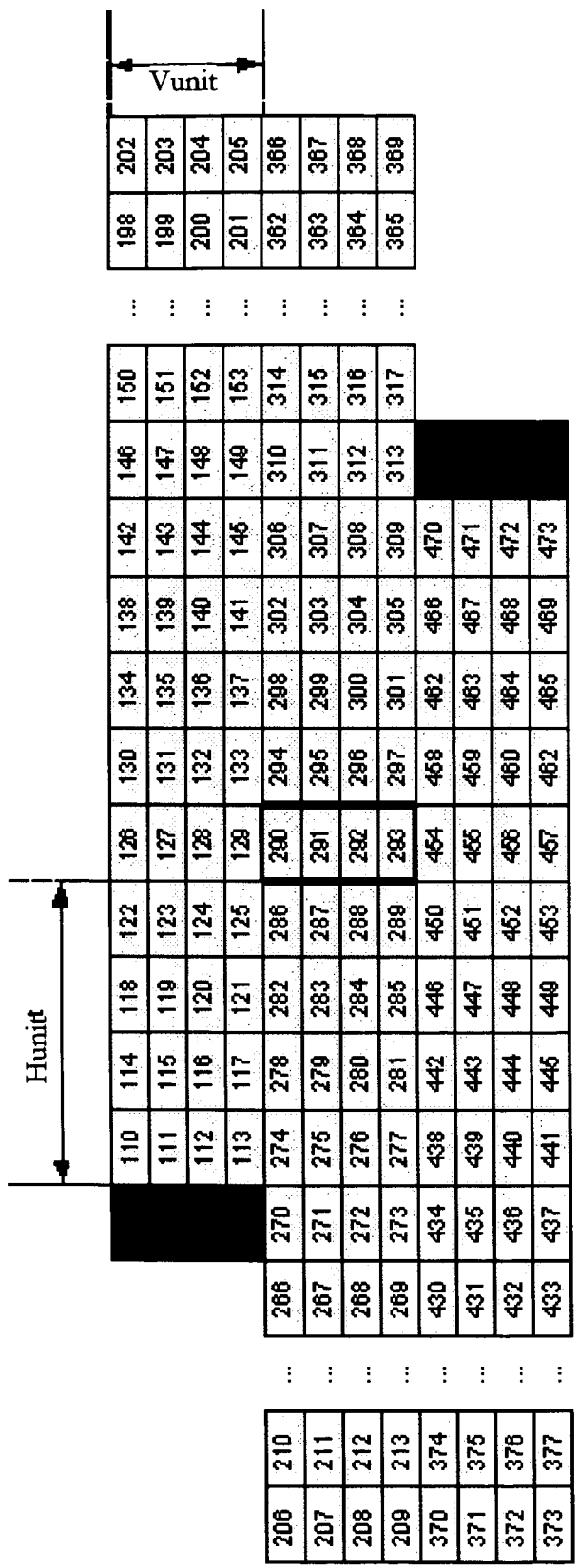
FIG. 9 shows an exemplary mapping of reference frame locations to motion estimation cache allocation units for a MBAFF frame and a vertical search range spanning an even-multiple-of-two number of allocation units, according to some embodiments of the present invention.

FIG. 9 illustrates a MBAFF picture having a vertical search range equal to an even multiple of two allocation units, for a frame width of 656 pixels (FrmSizeX=40) and a search window of 512 allocation units (SWSize=512). The computed vertical and horizontal search ranges are VUnit=4 and HUnit=4.

Figure 10:
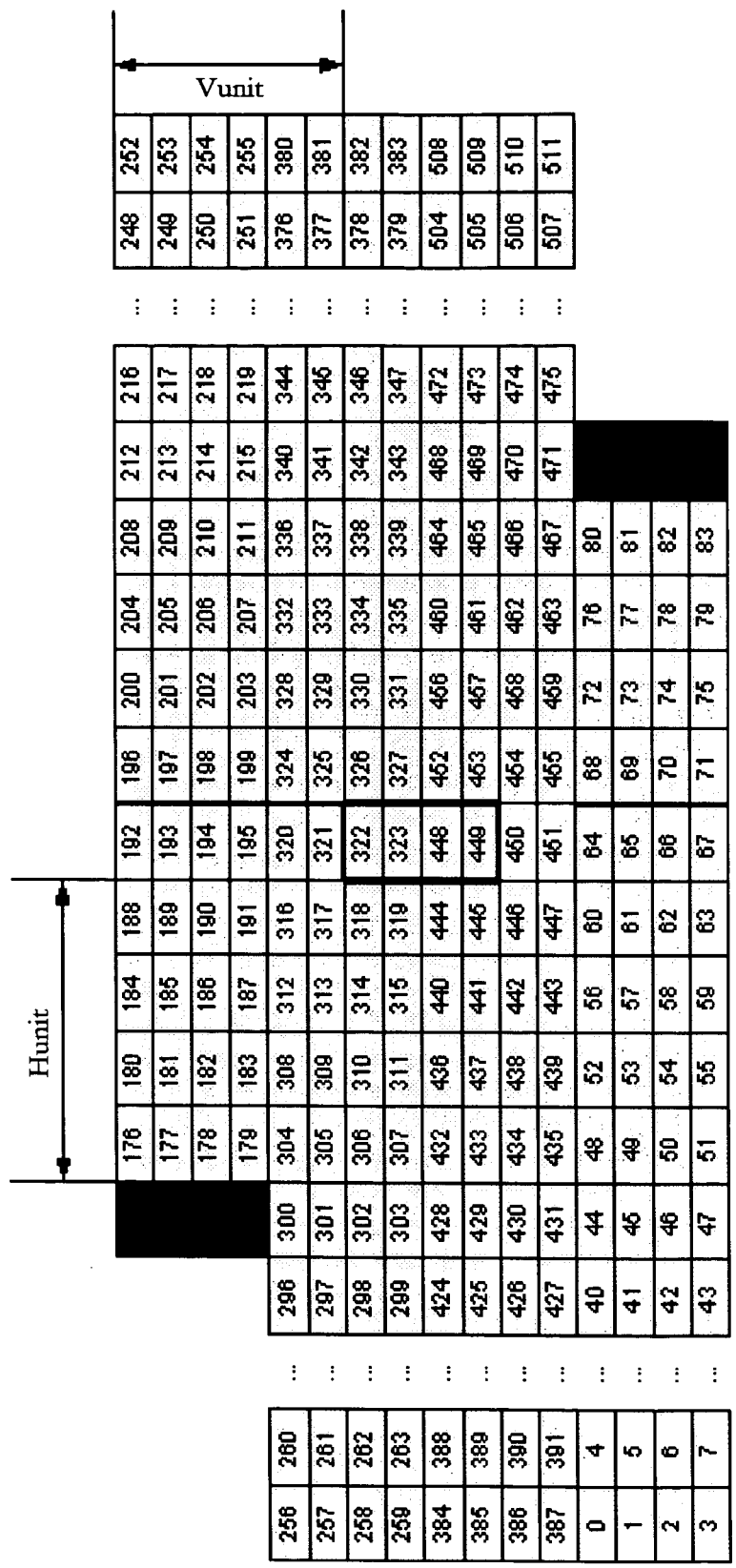
FIG. 10 shows an exemplary mapping of reference frame locations to motion estimation cache allocation units for a MBAFF frame and a vertical search range spanning an odd-multiple-of-two number of allocation units, according to some embodiments of the present invention.

FIG. 10 illustrates a MBAFF picture having a vertical search range equal to an odd multiple of two allocation units, for a frame width of 512 pixels (FrmSizeX=31) and a search window of 512 allocation units (SWSize=512). The computed vertical and horizontal search ranges are VUnit=6 and HUnit=4.

In some embodiments, the system determines which of the four cases illustrated in FIGS. 7-10 a current frame belongs to, and uses the determination in an advancement of the search window within the frame. In some embodiments, a sufficiency variable RdyDiff is used to determine when enough allocation units have been written, and an overwrite variable DeaDiff is used to determine when a last-written cache allocation unit may be overwritten. In particular, the system may determine that enough allocation units have been written when Ready=(WUnit−CUnit)(mod SWSize)>RdyDiff, wherein CUnit is a pointer to the allocation unit containing the top half of the reference block collocated with the current macroblock (124 in FIG. 4), and WUnit is a pointer to the last allocation unit written to the cache. The system may determine that WUnit may be overwritten when Deallocate=(CUnit−WUnit)(mod SWSize)>DeaDiff. The calculation of the parameters RdyDiff and DeaDiff may depend on the frame width, the vertical and horizontal search ranges, and on which of the cases illustrated in FIG. 7-10 the frame belongs to.

Consider the case illustrated in FIG. 7. The allocation units pointed to by CUnit and CUnit+1 store the reference block collocated with the current macroblock. Sufficient reference frame luma pixels have been loaded when $$W\text{Unit} > C\text{Unit} + V\text{Unit}*(Frm\text{Size}X+1)+2*H\text{Unit}+1 \pmod{SW\text{Size}}. \quad [1a]$$

WUnit can be overwritten when $$W\text{Unit} < C\text{Unit} - V\text{Unit}*(Frm\text{Size}X+1)-2H\text{Unit}(\text{mod } SW\text{Size}). \quad [1b]$$

The parameters RdyDiff and DeaDiff are $$Rdy\text{Diff} = V\text{Unit}*(Frm\text{Size}X+1)+2H\text{Unit}+1(\text{mod } SW\text{Size}), \quad [1c]$$

$$Dea\text{Diff} = V\text{Unit}*(Frm\text{Size}X+1)+2*H\text{Unit}(\text{mod } SW\text{Size}). \quad [1d]$$

Consider the case illustrated in FIG. 8. The reference block collocated with the current macroblock is stored in the allocation units pointed to by CUnit and CUnit+2*FrmSizeX+1. Sufficient reference frame luma pixels have been loaded when $$W\text{Unit} > C\text{Unit} + (V\text{Unit}+1)*(Frm\text{Size}X+1)+2*H\text{Unit} \pmod{SW\text{Size}}. \quad [2a]$$

WUnit can be overwritten when $$W\text{Unit} < C\text{Unit} - (V\text{Unit}-1)*(Frm\text{Size}X+1)-2*H\text{Unit}-1 \pmod{SW\text{Size}}. \quad [2b]$$

The parameters RdyDiff and DeaDiff are $$Rdy\text{Diff} = (V\text{Unit}+1)*(Frm\text{Size}X+1)+2*H\text{Unit}(\text{mod } SW\text{Size}), \quad [2c]$$

$$Dea\text{Diff} = (V\text{Unit}-1)*(Frm\text{Size}X+1)+2*H\text{Unit}-1(\text{mod } SW\text{Size}). \quad [2d]$$

Consider the case illustrated in FIG. 9. The reference block collocated with the current macroblock is stored in the allocation units pointed to by CUnit, CUnit+1, CUnit+2, and CUnit+3. Sufficient reference frame luma pixels have been loaded when $$W\text{Unit} > C\text{Unit} + V\text{Unit}*(Frm\text{Size}X+1)+4*H\text{Unit}+3 \pmod{SW\text{Size}}. \quad [3a]$$

WUnit can be overwritten when $$W\text{Unit} < C\text{Unit} - V\text{Unit}*(Frm\text{Size}X+1)-4*H\text{Unit}(\text{mod } SW\text{Size}). \quad [3b]$$

The parameters RdyDiff and DeaDiff are $$Rdy\text{Diff} = V\text{Unit}*(Frm\text{Size}X+1)+4*H\text{Unit}+3(\text{mod } SW\text{Size}), \quad [3c]$$

$$Dea\text{Diff} = V\text{Unit}*(Frm\text{Size}X+1)+4*H\text{Unit}(\text{mod } SW\text{Size}). \quad [3d]$$

Consider the case illustrated in FIG. 10. Four consecutive allocated units are allocated to the bottom half of a macroblock and the top half of the macroblock underneath, and are pointed to by CUnit, CUnit+1, CUnit+4*FrmSizeX−2, and CUnit+4*FrmSizeX−1. Sufficient reference frame luma pixels have been loaded when $$W\text{Unit} > C\text{Unit} + (V\text{Unit}+2)*(Frm\text{Size}X+1)+4*H\text{Unit}+1 \pmod{SW\text{Size}}. \quad [4a]$$

WUnit can be overwritten when $$W\text{Unit} < C\text{Unit} - (V\text{Unit}-2)*(Frm\text{Size}X+1)-4*H\text{Unit}-2 \pmod{SW\text{Size}}. \quad [4b]$$

The parameters RdyDiff and DeaDiff are $$Rdy\text{Diff} = (V\text{Unit}+2)*(Frm\text{Size}X+1)+4*H\text{Unit}+1(\text{mod } SW\text{Size}), \quad [4c]$$

$$Dea\text{Diff} = (V\text{Unit}-2)*(Frm\text{Size}X+1)+4*H\text{Unit}-2(\text{mod } SW\text{Size}). \quad [4d]$$

In some embodiments, in order to speed up the motion estimation process at the beginning of a frame, allocation units are filled first vertically and then horizontally for an initial macroblock stripe having a height of VUnits+2 (VUnit+4 for MBAFF pictures). For example, for a frame width of 40 allocation units, the allocation units may be initially filled in the order 0, 1, 82, 83, 164, 165, 246, 247 (a column of eight allocation in the top left corner of the reference frame), followed by 2, 3, 84, 85, 166, 167, 248, 249 (a column of eight allocation units immediately to the right of the first column), and so on. For a frame width of 49 allocation units, the cache allocation units may be filled in the order 101, 200, 201, 300, 301, 400, 401, followed by 103, 202, 203, 302, 303, 402, 403, and so on.

In some embodiments, the motion estimation cache is capable of providing line segments in response to receiving a motion vector, which may be an X/Y address relative to the top left corner of a current macroblock. In some embodiments, the motion vector is mapped to the motion estimation cache by first converting the motion vector to an absolute location in the reference frame, and then mapping that location to the motion estimation cache. FIGS. 11-A-B show exemplary C-like code illustrating a mapping of a motion vector to a motion estimation cache allocation unit. If an absolute allocation unit number (VAU) is much larger than the number of allocation units in the search window of interest (SWSize), the mapping may be performed incrementally, in order to facilitate performing modulus operations in one clock cycle. A remainder calculation of the form AU=VAU % SWSize may take more than one clock cycle for large values of VAU relative to SWSize. By contrast, an incremental operation of the form AU=(AU+auoffset) % SWSize may take a single clock cycle if auoffset is less than SWSize.

The code of FIG. 11-A illustrates an exemplary identification of an allocation unit containing a first line of the macroblock (for MBAFF pictures, the allocation unit containing the first line of the macroblock pair). The code of FIG. 11-A generates an allocation unit value AU according to a set of x-y coordinates of a current macroblock (currmbx, currmby), a frame width (MBX), a vertical search range (VUnit), and a search window size (SWSize).

The code of FIG. 11-B illustrates an exemplary computation of horizontal and vertical offsets, represented in allocation units. Relative offsets xoff and yoff are determined according to a motion vector (mvx, mvy) and the y-coordinate of the current macroblock. The relative offsets xoff and yoff are then converted to an absolute offset, expressed in allocation units. The absolute offset is used to determine an allocation unit AU corresponding to a motion vector (mvx, mvy) and current macroblock position (currmbx, currmby).

In some embodiments, a motion estimation cache may be split into two banks, each containing a number of RAM units (e.g. four RAM units). Each allocation unit may be split between two RAM units of a single bank, with one RAM unit containing even pixels of even lines and odd pixels of odd lines, and the other RAM unit containing odd pixels of even lines and even pixels of odd lines. The pixels of an allocation unit line may be obtained by combining the contents of the two RAM units at the same address. For MBAFF frames, groups of four allocation units may be assigned to the same bank. Such a physical memory configuration may facilitate normal and rough search modes of a motion estimation engine.

Figure 12:
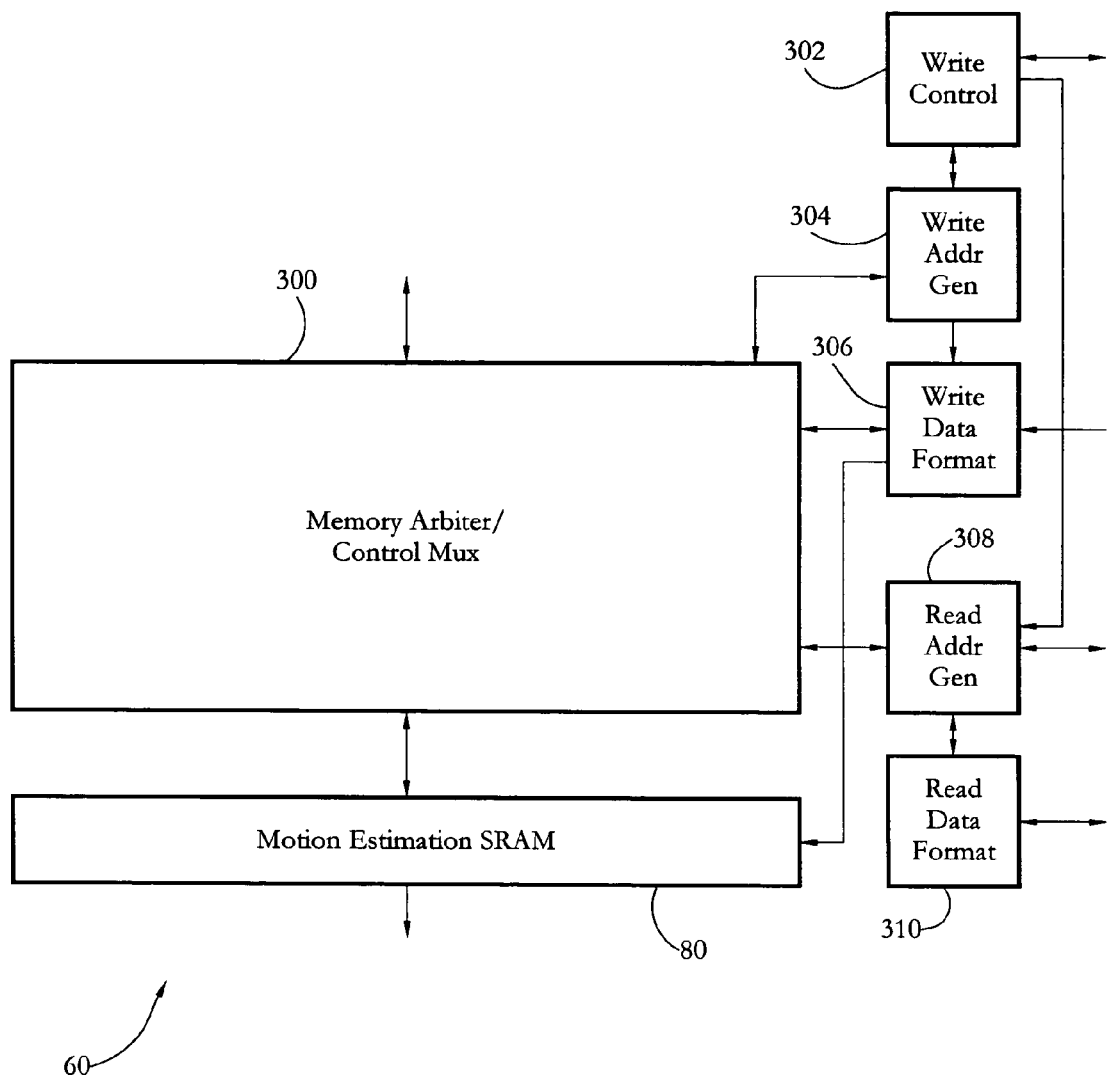
FIG. 12 shows an exemplary internal structure of a motion estimation cache and manager according to some embodiments of the present invention.

FIG. 12 shows an exemplary internal structure of a motion estimation cache unit 60 according to some embodiments of the present invention. A memory arbiter and control multiplexing unit 300 is connected to a motion estimation SRAM cache 80. Arbiter unit 300 is connected to an external memory interface 58/58' (FIGS. 2-A-B). Arbiter unit 300 arbitrates cache access requests, and multiplexes control (read/write) signals to a set of RAM units of SRAM cache 80. A write control unit (write control logic) 302 is connected to a motion estimation/compensation unit 64/64' (FIGS. 2-A-B). Write control unit 302 receives motion estimation data, and maps reference frame coordinates to motion estimation cache allocation units as described above.

A write address generator 304 is connected to write control unit 302 and arbiter unit 300. Write address generator 304 receives from write control unit 302 an allocation unit number and search window (cache partition) number for motion estimation data to be written to cache 80, and generates a physical cache address for the data. Generating the address includes determining an absolute allocation unit number by adding a search window offset to a relative allocation unit number, and generating a physical cache RAM address from the absolute allocation unit number as described above.

A write data format unit 306 is connected to arbiter unit 300, write address generator 306, and external memory interface 58/58' (FIGS. 2-A-B). Write data format unit 306 may be used to reformat data, if needed, for transfer between cache 80 and external RAM 50 (FIGS. 2-A-B). For example, in some embodiments data received from RAM 50 may be 16-bit data, while data sent to cache 80 may be 64-bit data.

A read address generator 308 is connected to arbiter unit 300 and write control unit 302, and to motion estimation/compensation unit 64/64' (FIGS. 2-A-B). Read address generator receives read requests from motion/estimation compensation unit 64/64', including motion vectors, and maps the requested data to addresses within motion estimation cache allocation units as described above.

A read data format unit 310 is connected to read address generator 308, motion estimation/compensation unit 64/64', and external memory interface 58/58' (FIGS. 2-A-B). If data requested by motion estimation/compensation unit 64/64' is not within motion estimation cache 80, and is instead retrieved from external RAM 50, read data format unit 310 may be used to reformat data received from external RAM 50 into a format expected by motion estimation/compensation unit 64/64'.

Figure 13:
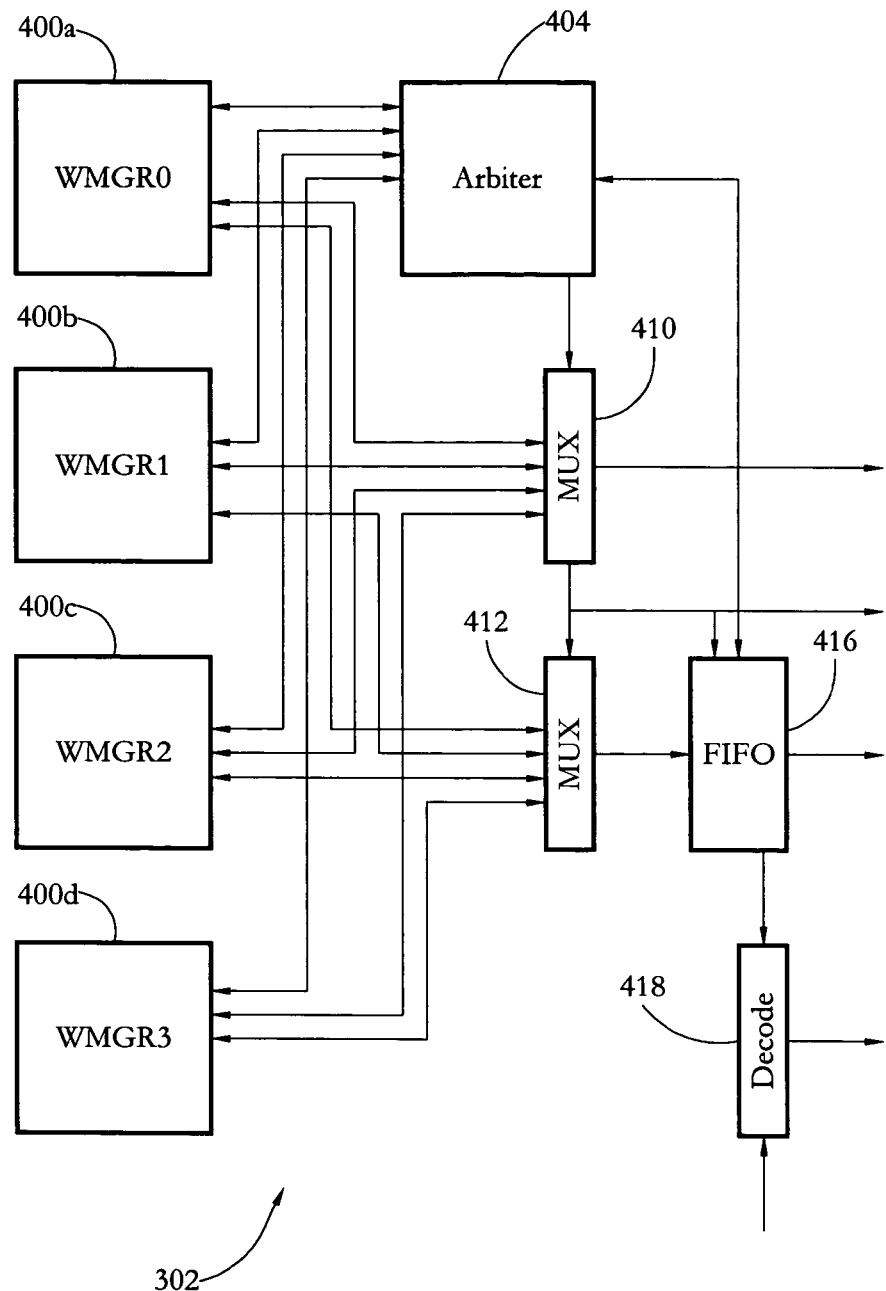
FIG. 13 shows an exemplary internal structure of a write control logic unit of the cache manager of FIG. 12, according to some embodiments of the present invention.

FIG. 13 shows an exemplary internal structure of write control unit 302 according to some embodiments of the present invention. A set of cache partition managers 400a-d are connected to an arbiter 404 and multiplexers 410, 412. Arbiter 404 arbitrates cache access requests received from cache partition managers 400a-d. Each manager 400a-d manages the writing of data to its corresponding cache partition. In some embodiments, each manager 400a-d includes several counters. Such counters may include x- and y-address counters for the next reference frame to be loaded into a cache allocation unit. A write allocation unit counter WUnit, described above, points to the allocation unit to be written by the data indicated by the x- and y-address counters. A difference between the WUnit counter and a current macroblock allocation unit may be compared to a DeaDiff value as described above to determine whether an allocation unit is to be written. A written allocation counter points to the last complete allocation unit written. A difference between this counter and the current macroblock allocation unit is compared to a RdyDiff value as described above to determine if the search window is ready. One or more current macroblock allocation unit counters may be used to provide references for accesses to the search window.

Multiplexer 410 multiplexes x- and y-coordinates of reference frame blocks requested by managers 400a-d from external memory interface 58/58' (FIGS. 2-A-B), and transmits a current cache partition identifier to multiplexer 412 and write address generator 304 (FIG. 12). Multiplexer 412 multiplexes WUnit (current allocation unit to be written) signals received from managers 400a-d, for transmission to write address generator 304 (FIG. 12). FIFO 416 buffers received requests, and outputs a write allocation number. A decoder 418 receives transfer done indicators from write address generator 304 (FIG. 12), and transmits transfer done indicators to the corresponding managers 400a-d.

It will be clear to one skilled in the art that the above embodiments may be altered in many ways without departing from the scope of the invention. Various hardware and software configurations and techniques can be used to implement adaptive memory allocation methods as described above. The present invention further provides computer-readable media encoding instructions to perform methods described above. Accordingly, the scope of the invention should be determined by the following claims and their legal equivalents.

What is claimed is:

1. A video data processing method comprising:
adaptively partitioning a motion estimation cache according to a number of reference frames corresponding to a current frame to be coded, wherein size of each cache partition is chosen according to temporal distance of its corresponding reference frame and the current frame;
selecting a search window area of a reference frame, the search window area having a quasi-rectangle shape with truncated upper left and lower right corners; and
accessing reference frame prediction data through said search window area of the reference frame in the motion estimation cache according to the adaptive partitioning of the motion estimation cache.

2. The method of claim 1, wherein each of the partitions is organized according to its corresponding reference frame width.

3. The method of claim 1, wherein each of the partitions is organized according to a frame coding type of a reference frame, the coding type being selected from a macroblock-adaptive frame/field mode and a non-macroblock-adaptive frame/field mode.

4. The method of claim 1, further comprising encoding a set of data of the current frame with reference to the prediction data, wherein accessing the prediction data comprises writing the prediction data in the motion estimation cache.

5. The method of claim 4, wherein adaptively partitioning comprises defining a number of allocation units in each of the partitions.

6. The method of claim 5, wherein each allocation unit corresponds to a 16×8 pixel block.

7. The method of claim 1, further comprising decoding a set of data of a current frame with reference to the prediction data, wherein accessing the prediction data comprises reading the prediction data from the motion estimation cache.

8. The method of claim 7, wherein adaptively partitioning comprises defining a number of allocation units in each of the partitions.

9. The method of claim 8, wherein each allocation unit corresponds to a 16×8 pixel block.

10. The method of claim 1, wherein the quasi-rectangle shape has a horizontal extent substantially equal to a width of the reference frame.

11. The method of claim 1, further comprising defining a motion estimation search range within a part of the search window area.

12. The method of claim 11, wherein the motion estimation search range is laterally bounded by the truncated upper left and lower right corners.

13. A video coding apparatus comprising:
a motion estimation cache; and
a motion estimation cache manager connected to the motion estimation cache, the motion estimation cache manager being configured to:
adaptively partition the motion estimation cache according to a number of reference frames corresponding to a current frame to be coded, wherein size of each cache partition is chosen according to temporal distance of its corresponding reference frame and the current frame;
select a search window area of a reference frame, the search window area having a quasi-rectangle shape with truncated upper left and lower right corners; and
access prediction data through said search window area of the reference frame in the motion estimation cache according to the adaptive partitioning of the motion estimation cache.

14. The apparatus of claim 13, wherein the coding apparatus comprises a video encoder.

15. The apparatus of claim 13, wherein the coding apparatus comprises a video decoder.

16. The apparatus of claim 13, wherein the motion estimation cache comprises a static random access memory.

17. The apparatus of claim 13, further comprising a motion estimation search engine connected to the motion estimation cache manager.

18. The apparatus of claim 13, further comprising an external random access memory connected to the motion estimation cache manager through an external memory interface.

19. The apparatus of claim 13, wherein the motion estimation cache manager is further configured to perform adaptive mapping of the prediction data to the motion estimation cache according to a width of a reference video frame comprising the prediction data.

* * * * *